Figure 4:
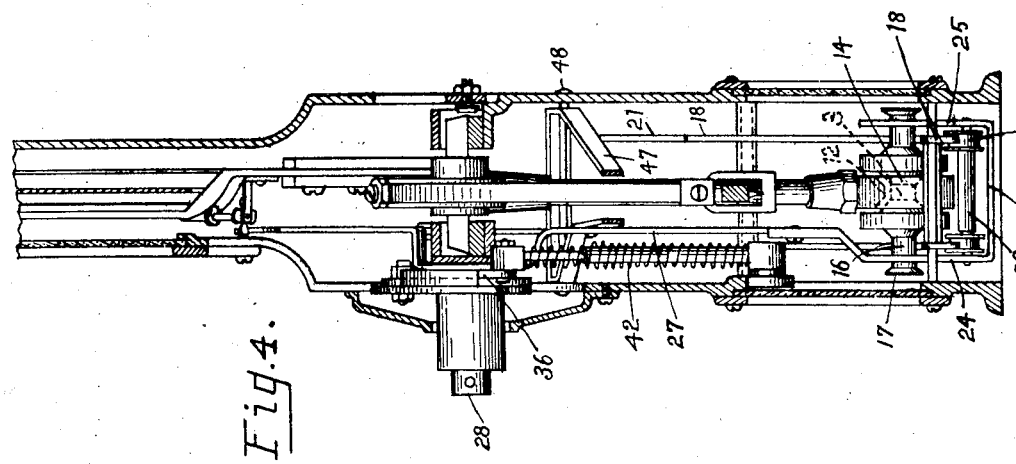

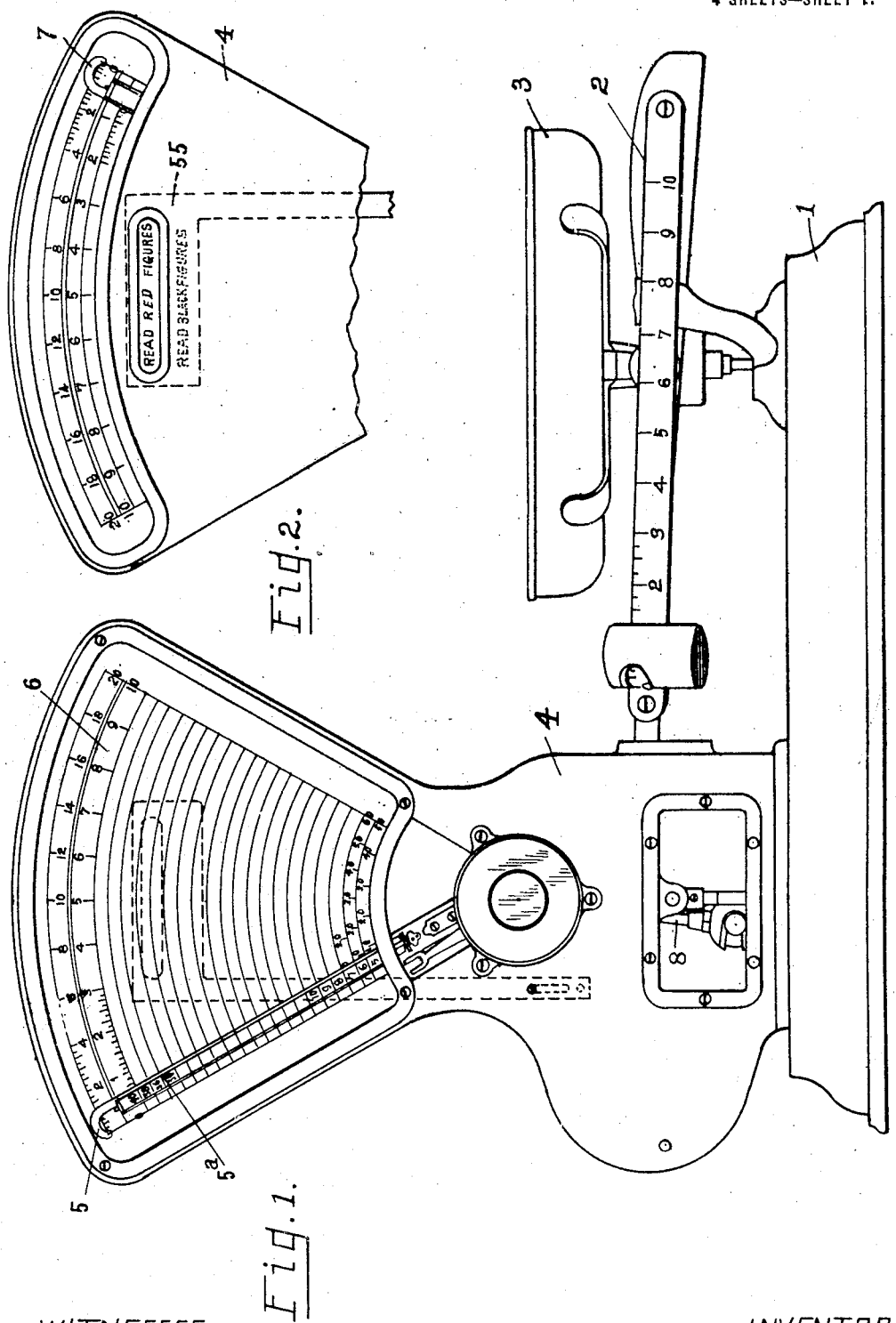

H. O. HEM.
AUTOMATIC WEIGHING SCALE.
APPLICATION FILED OCT. 23, 1916.

1,324,151.

Patented Dec. 9, 1919.
4 SHEETS—SHEET 2.

WITNESSES:
D. C. Walter
E. F. Ulrich

INVENTOR.
Halvor O. Hem
by George R. Frye
Attorney

H. O. HEM.
AUTOMATIC WEIGHING SCALE.
APPLICATION FILED OCT. 23, 1916.
1,324,151.
Patented Dec. 9, 1919.
4 SHEETS—SHEET 3.
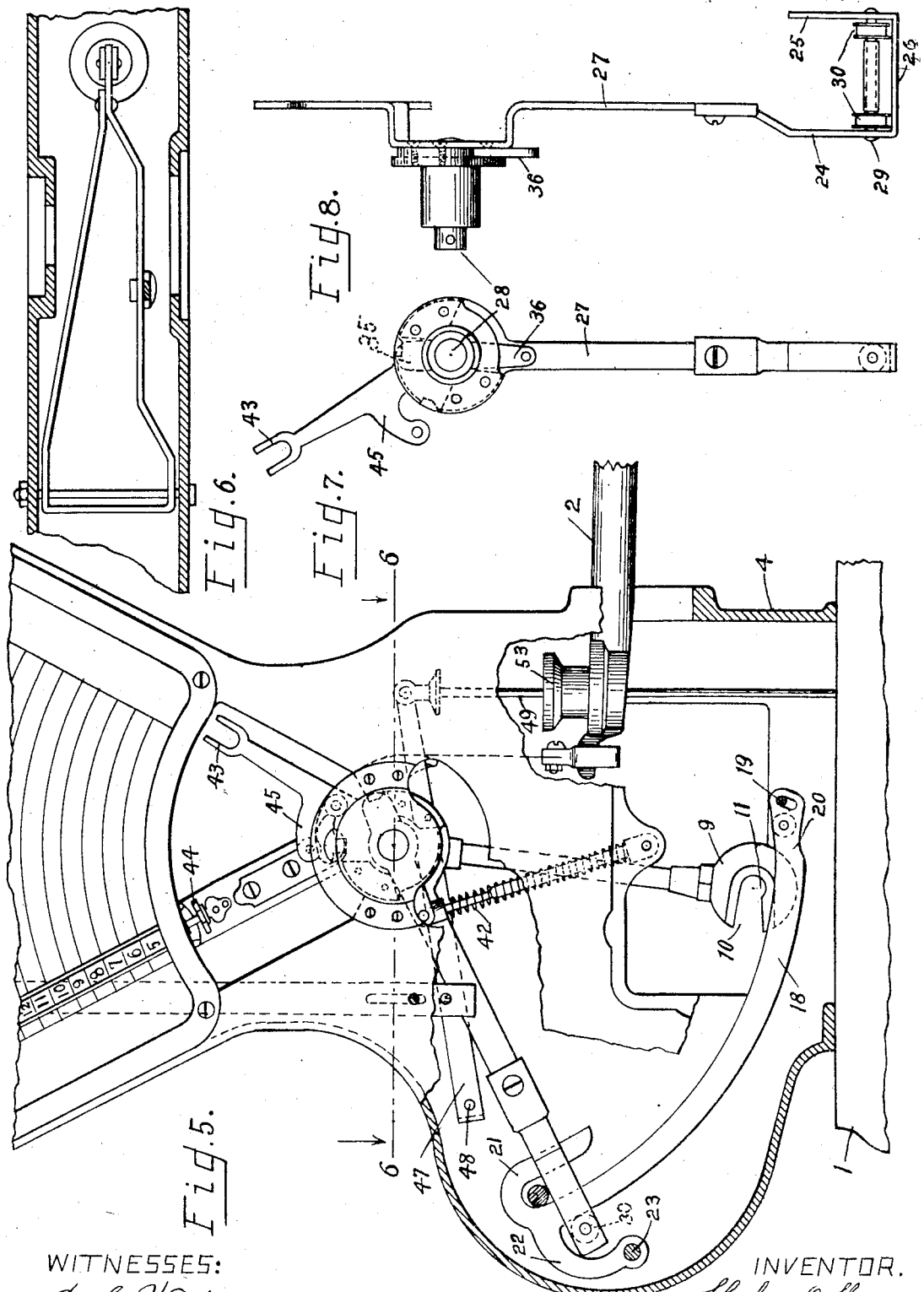
WITNESSES:
D. C. Walter
E. F. Ulrich
INVENTOR.
Halvor O. Hem
by George K. Frye
Attorney

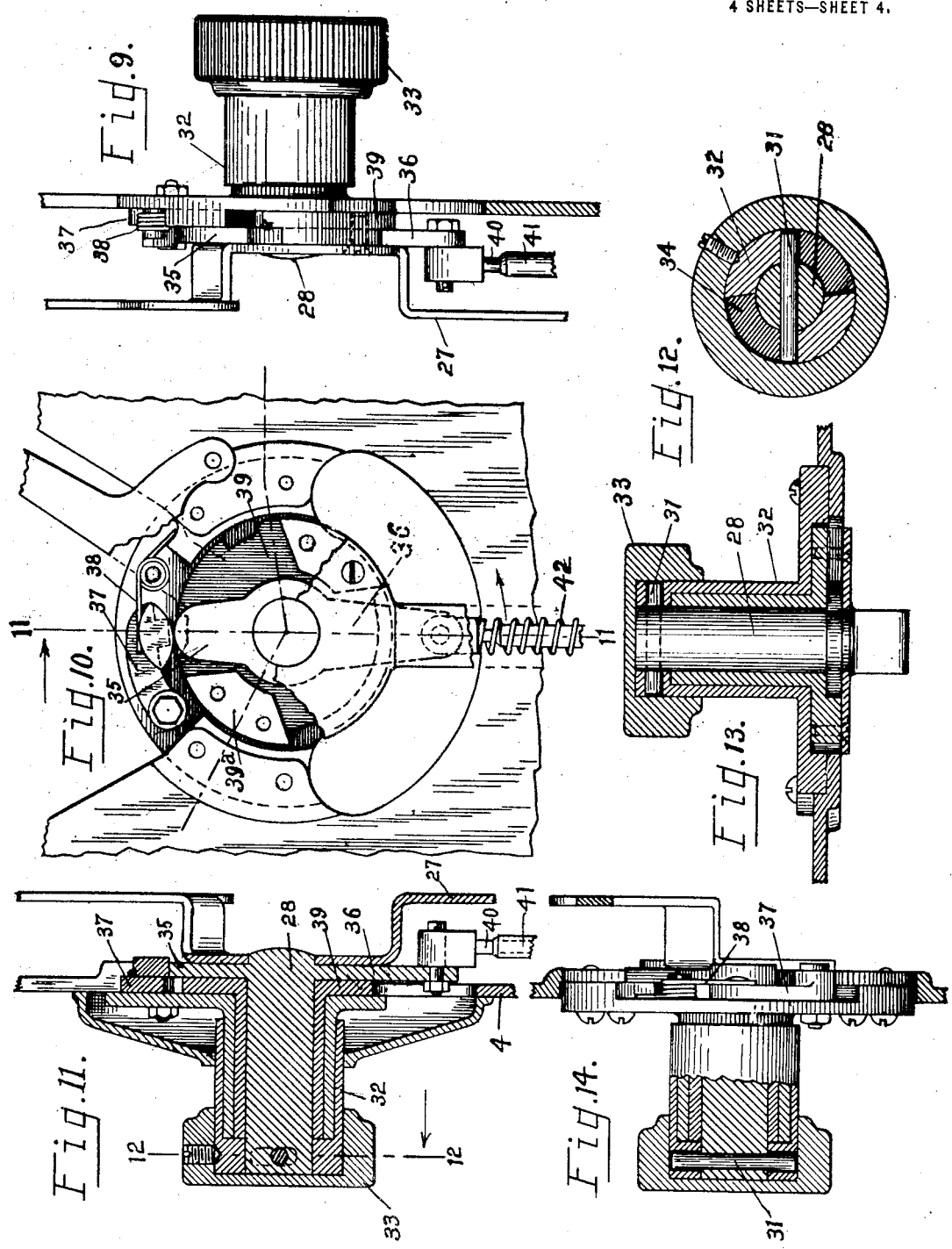

UNITED STATES PATENT OFFICE.

HALVOR O. HEM, OF TOLEDO, OHIO, ASSIGNOR TO TOLEDO SCALE COMPANY, OF TOLEDO, OHIO, A CORPORATION OF NEW JERSEY.

AUTOMATIC WEIGHING-SCALE.

1,324,151.     Specification of Letters Patent.     Patented Dec. 9, 1919.

Application filed October 23, 1916. Serial No. 127,258.

*To all whom it may concern:*

Be it known that I, HALVOR O. HEM, a citizen of the United States, residing at Toledo, in the county of Lucas and State of Ohio, have invented certain new and useful Improvements in Automatic Weighing-Scales, of which the following is a specification.

My invention relates to pendulum weighing scales and is intended for, though not necessarily confined in all of its uses to, computing scales. In the particular type of pendulum computing scales to which my invention is especially adapted, it is customary to employ a chart or table of computations and weights together with an index hand carried by the pendulum and arranged to sweep over such chart or table, said hand having inscribed upon it one or more rows of price numerals. The pendulum is appropriately connected with a scale beam carrying a platter on which the commodity to be weighed is placed. The weight of such commodity causes the index hand to move over the chart and properly indicate the weight of the commodity by pointing to one of the weight numerals on the chart or a graduation mark associated therewith. The particular numerals on the index hand denoting the price per pound or other unit of measure locate the proper computation, the index hand being usually formed along one side in such manner as to assist in locating a computation, as, for example, being provided with a taut reading wire spaced a short distance from the face of the chart. To provide for an increased weighing capacity such as effected through an increase in weight of the pendulum by means of the placing of an auxiliary weight thereon, it is customary to inscribe two rows of weight numerals on the chart, one representing double the weighing capacity of the first and providing upon the index hand two rows of price numerals, each numeral of one row being double the companion numeral of the other row. Contrasting colors are ordinarily employed so that the user of the scale, as well as the customer, may readily perceive whether the scales are being used under one weighing capacity or the other.

The principal object of the present invention is to provide improved means for placing an auxiliary weight upon the pendulum and removing it therefrom and insuring its being held in proper position when either on or off the pendulum, which means render it entirely unnecessary for the user of the scales to handle the auxiliary weight, the latter remaining at all times within the casing of the machine. Thus, the invention provides for the removal of the auxiliary weight from the pendulum by simply turning a knob which protrudes from the casing of the scale, the carrier for the auxiliary weight being then automatically lifted, caught, and held beyond the range of the pendulum's swing. The replacing of the auxiliary weight upon the pendulum involves merely the turning of the knob in the opposite direction, said carrier and the auxiliary weight being thus caused to fall by gravity and also being urged by mechanical means to travel its full predetermined distance, the said weight being automatically deposited upon the pendulum while the carrier takes up a position out of the range of the pendulum's swing. More specifically stated, this object is to effectually guard against any possible escape of the auxiliary weight in the process of its removal from, or replacement upon, the pendulum, and insure its being held in proper position when either on or off the pendulum, even though the manipulation of parts provided for the proper handling of the auxiliary weight be done carelessly or with intentional violence or in attempt to defraud.

Another object of my invention is to provide means for adjusting the effective weight of the scale beam and the pull exerted thereby upon the pendulum mechanism by depositing a supplemental weight on the scale beam or removing it therefrom simultaneously with the placing of the auxiliary weight upon the pendulum and its removal therefrom.

With these and incidental objects in view, the invention consists in certain novel features of construction, arrangement and combination of parts, the essential elements whereof are recited in the appended claims and preferred embodiments of which are illustrated in the accompanying drawings, wherein the same reference numerals designate the same or similar parts throughout the several views.

In the drawings:—

Figure 3:
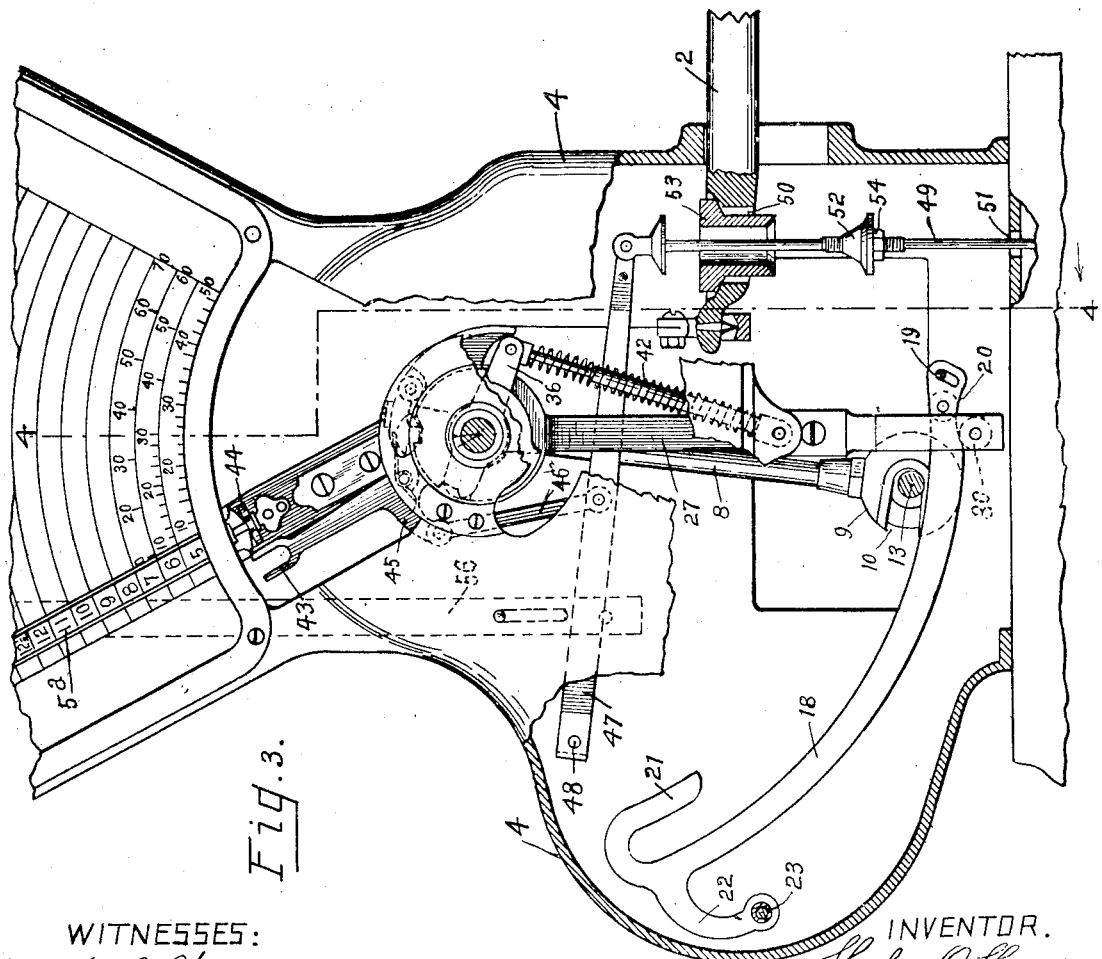

Figure 1 is a front elevation of a pendulum weighing scale embodying my invention; Fig. 2 is a rear elevation of the upper part of the chart housing; Fig. 3 is an enlarged detail view of portions of the scale, partly in front elevation and partly in longitudinal section, the several elements being shown in the positions assumed when the auxiliary pendulum weight is on the pendulum; Fig. 4 is a vertical transverse section taken substantially on the line 4—4 of Fig. 3 looking in the direction of the arrow; Fig. 5 is an enlarged detail elevation of portions of the scale, the parts being shown in the positions assumed when the auxiliary pendulum weight is held away from the pendulum; Fig. 6 is a detail section taken substantially on the line 6—6 of Fig. 5, but with certain elements omitted to more clearly show in plan view the supporting lever carrying the supplemental weight co-acting with the scale beam; Figs. 7 and 8 are detail front and side elevations respectively of the carrier for the auxiliary pendulum weight; Fig. 9 is a detail side elevation of the knob and associated mechanism; Fig. 10 is a front elevation thereof, with parts broken away; Fig. 11 is a central longitudinal section taken on the line 11—11 of Fig. 10; Fig. 12 is a detail section taken substantially on the line 12—12 of Fig. 11; Fig. 13 is a central transverse section through the knob and associated parts; and Fig. 14 is a similar detail view with associated parts shown in plan.

It will not be necessary to give a detailed description of the particular type of computing scales here chosen for the purpose of illustrating the preferred embodiments of my invention, because that type of scale is well-known through extensive commercial use and a considerable number of prior patents, for example, the patent to Wetzel, No. 998,220, dated July 18, 1911.

The reference numeral 1 designates a suitable base above which is fulcrumed the scale beam 2, supporting a scale pan or platter 3 and connected within the housing 4 with an index hand 5 which moves over a computing chart 6 and has a rear portion 7 moving over two rows of weight numerals on the rear side of the chart plate (see Fig. 2). Corresponding rows of weight numerals appear on the front side of said plate just above the chart or table of computations (see Fig. 1) and it is customary to inscribe them in contrasting colors. As shown, the upper row provides for double the weight capacity of the lower row and the index arm 5 ordinarily bears two vertical rows of numerals correspondingly contrasted and denoting prices per unit of weight, one row for use when the scales are weighing in one weight capacity and the other row being used when the scales are weighing in the other weight capacity. Preferably the two vertical rows on the index arm 5 are inscribed on opposite sides of a rotatable strip or bar 5ᵃ suitably journaled in bearings carried by the index arm, this strip or bar being so located upon the index arm that when turned with either side facing outwardly the numerals thus presented to view will register with the various rows of numerals upon the computing chart to co-act therewith in locating the proper computation on the chart. The vertical rows on the strip or bar 5ᵃ are preferably formed of contrasting colors, as, for example, one of red and one of black.

The index arm 5 is compounded with a pendulum 8 arranged to swing within the housing 4, and it will be understood that the different sets of weight and price numerals are to be read according to the weighing effected by the pendulum. The latter carries at its lower end a permanent weight 9 of disk-like form made with a radial and slightly flaring opening 10 entering one side and extending around the center of the disk concentrically therewith. The concentric portion of the side of this opening extends through more than a half circle and the lower edge of the opening beyond the concentric portion diverges from the upper edge. Thus a slight depression 11 is formed in the lower side of the radial opening at the inner end thereof, as clearly shown in Fig. 3. The portion of the weight disk 9 immediately surrounding said radial opening is substantially V-shaped in cross section, although this formation is preferably not continued to a sharp edge but terminates in a narrow flat surface 12. The auxiliary weight takes something the shape of a dumb-bell, comprising a reduced central portion 13 of the same lateral extent as the said flat surface 12 of the permanent weight and the two side portions 14 in the shape of truncated cones, whose angles correspond with those of the V-shaped portions of the permanent weight, as clearly shown in Fig. 4. Beyond the side portions 14 the auxiliary weight is provided with flanges 15 designed to take over the sides of the permanent weight beyond the V-shaped portions thereof, and from the centers of the flanged heads of the auxiliary weight project trunnions 16 with flanged ends 17 for a purpose presently to be described.

Without proceeding further, it will be seen that the above described formation of the permanent and auxiliary weights is calculated to insure a perfectly accurate and correct engagement between them and one which cannot readily be disturbed when once established. The reduced central portion 13 of the auxiliary weight resting in the depression 11 of the permanent weight insures against the accidental removal of the auxiliary weight in a radial direction and the engagement of the conical portions 14 of the auxiliary weight with the V-shaped portions of the permanent weight serve to insure the auxiliary weights properly entering the opening in the permanent weight and taking up the proper position therein. The flanges also serve to prevent any possible axial displacement of the auxiliary weight. As will hereinafter appear, this particular constructional formation of weights is also of peculiar advantage in connection with means hereinafter described for removing or replacing the weight at will.

Proceeding now to a description of the means employed for controlling the auxiliary weight, the numeral 18 designates a pair of guide rails mounted within the housing 4 and constituting a track upon which the auxiliary pendulum weight may travel. These rails are loosely secured at one end in the base of the housing, as indicated at 19, on opposite sides of the pendulum somewhat beyond the latter's downward swing, an inclined slot being cut in each of the guide rails through which passes a transverse pin, the ends of which are mounted in the housing 4. The under surface of each of the rails 18 is also provided with a recess 20 having inclined walls adapted to co-act with rollers on the carrier arm and adjacent the recess 20 the rail bulges downwardly and then gradually tapers upwardly therefrom. In other words, the lower surface of the rails 18 below the normal position of the permanent pendulum weight is farthest removed from the axis on which the pendulum swings, and the radial distance from this axis gradually diminishes as the rails mount upwardly. This eccentric lower surface of the rails 18 is essential for the automatic raising of one end of the rails to aid in the deposit of the auxiliary pendulum weight, as will be hereinafter described. The rails pass the permanent pendulum weight 9 on opposite sides thereof with their upper surface slightly below the depressed portion 11 of the opening in said weight and thence curve upwardly to a point beyond the limits of the upward swing of the pendulum, then curving back over themselves, as at 21, to form runways for the reception of the auxiliary pendulum weight when removed from the pendulum. An arm 22 curves downwardly from the upper extremity of the guide rails 18 and is loosely mounted on a transverse pin 23 so that the guide rails may pivot on said pin. The trunnions 16 of the auxiliary weight extend over the guide rails, respectively and the flanges 17 take over the outer sides of the rails. It will be seen, therefore, that this auxiliary weight may roll up and down the track formed by said rails without danger of leaving the same and always preserved in proper position to enter and leave the opening in the permanent pendulum weight. When the auxiliary weight is retained at the upper end of the runways, the pendulum is free to swing throughout its entire arc without being at all influenced by the mechanism employed to change the capacity of the scale.

The auxiliary weight is moved upwardly on its track and held in its inoperative position by means of a hanger arranged to travel between the rails 18 and comprising arms 24, 25 acting against the trunnions 16 and a connecting bar 26, the latter sufficiently lowered to pass underneath the permanent pendulum weight. The arm 24 of this hanger is secured to a pendent arm 27 which has a hub journaled upon a shaft 28 carried by a bracket plate fastened to the front of the housing 4 concentrically with the fulcrum of the pendulum, as shown in Fig. 4. The arm 27 and the hanger form a unitary structure arranged to swing upon a center coincident with that of the pendulum and through a range of movement sufficient to carry the auxiliary weight entirely beyond the upward swing of the pendulum, as shown in Fig. 5, and also to leave the pendulum free as to the extent of its downward swing when carrying the auxiliary weight, as shown in Figs. 1 and 3. Between the arms 24 and 25 of the hanger and slightly above the crossbar 26 is fixed a shaft 29 on which is journaled a pair of flanged rollers 30 which are adapted to contact with the lower surface of the guide rails 18, as shown in Figs. 3 and 5. As the hanger is moved from its uppermost position (Fig. 5) to its lowermost position (Fig. 3) to allow the auxiliary weight to enter the permanent pendulum weight 9, the wheels 30 ride along the curved lower surface of the guide rails and as they approach the position directly beneath the pendulum, they force the guide rails upwardly because of the greater width of the rails at this point, this upward movement of the rails bringing their upper surfaces in line with or slightly above the lip of the recess 10 in the permanent pendulum weight, enabling the auxiliary weight to readily enter said recess. As the sweep of the hanger arm continues beyond the widest portion of the guide rails they enter the recess 20 in said rails, which allows the rails to again fall to their original positions. Similarly, when the hanger arm is swung upwardly to remove the auxiliary weight from the pendulum, the initial movement causes the wheels 30 to ride up the inclined walls of the recess 20 and lift the tracks so that the upper surfaces thereof engage the trunnions of the auxiliary weight and lift the same from the depression 11 slightly prior to the time the hanger arms contact with said trunnions to force the auxiliary weight up the inclined rails. Thus, the eccentric lower surface of the rails co-acting with the wheels 30 in the hanger arms serves to provide an effective means for allowing the rails to guide the auxiliary weight directly into the central depression 11 in the permanent pendulum weight, while forcing the guide rails to sink below the level of the trunnions of the auxiliary weight when the auxiliary weight is upon the pendulum. The elevation of the guide rails during the depositing of the auxiliary weight on the pendulum renders it practically impossible for the weight not to enter the central depression 11 in the pendulum.

The means for operating the auxiliary weight carrier composed of the arms 27 and the hanger, as above mentioned, will now be described. The upper part of the arm 27 is fixed to the ratchet plate or flange 39 journaled on the shaft 28, which shaft extends outwardly beyond the front of the housing 4 and adjacent its forward extremity carries a transverse pin 31 adapted to co-act with a sleeve 32 so as to effect a loose connection therewith. The sleeve 32 preferably carries a knurled or corrugated knob 33 for convenience in turning. As shown in Fig. 12, the sleeve 32 is provided adjacent its forward extremity with slots 34 into which the ends of the pin 31 extend, and the knob 33 may be freely rotated until the walls of the slots 34 are brought into contact with the pin 31, whereupon further movement will rotate the sleeve and shaft together. Fixed to the shaft 28 adjacent its rear extremity are upper and lower arms 35 and 36 respectively, the lower arm 36 having pivotally connected thereto a spring-operated mechanism for forcing the complete travel of the shaft when it has advanced in either direction beyond a certain point. The upper arm 35 co-acts with a pawl 37 pivoted on the fixed bracket plate and normally pressed downwardly, as by the light spring 38, into engagement with the ratchet plate 39 mounted on the shaft 28, as shown in Fig. 11. The ratchet plate 39 is provided with a pair of rearwardly-extending projections 39ª adapted to be contacted by the upper arm 35 during the rotation of the shaft 28 subsequent to the lifting of the pawl 37 by said upper arm. This shifting of the ratchet plate allows the pawl to alternately rest in a pair of apertures in the surface of the ratchet plate to lock the auxiliary weight-depositing mechanism in either its lower or uppermost position. The spring-pressed means for urging the complete travel of the hanger mechanism preferably comprises a rod 40 pivotally mounted at its upper end to the arm 36 and telescoping within the hollow sleeve 41 pivotally mounted at its lower extremity upon a fixed portion of the scale, a coil spring 42 surrounding said sleeve and rod and abutting at its opposite ends against flanges provided thereon. As the shaft 28 is rotated, as will be hereinafter described, the lower arm 36 is swung from its normal raised position (see Figs. 3 and 5) to the central position shown in Fig. 10, during which movement the spring 42 is compressed, and as the arm swings beyond this central lowered position, the spring exerts a pressure to force the same to the other extremity of its movement.

Extending upwardly beyond the shaft 28 the arm 27 is provided with forks 43 adapted to coöperate with the star-wheel 44 fixed at the lower extremity of the rotatable strip or bar 5ª of the indicator hand. A curved projecting arm 45 on this upper extremity is pivotally connected, as by means of the link 46 (see Fig. 3), with the lever 47, which is pivoted at its rear extremity, as at 48, upon the housing 4 of the scale and carries at its opposite end the vertical rod 49 which passes through an aperture 50 in the inner end of the scale beam and is guided in its vertical movement by a smaller aperture 51 formed in the scale base. Intermediate its ends the rod 49 is threaded for the reception of a conical member 52 which is adapted to contact with the supplemental beam weight 53 to lift the same from the beam and to support the same when removed from the scale beam. The conical member 52 may be maintained in any adjusted position by means of the lock nut 54. From the positions of the auxiliary pendulum weight and hanger and of the lever 47 and supplemental beam weight 53 in Figs. 3 and 5, it will be noted that the weight-depositing mechanisms are so connected and arranged that whenever the auxiliary pendulum weight is deposited upon the pendulum, the supplemental beam weight 53 is likewise deposited upon the scale beam, and when the auxiliary pendulum weight is removed, the supplemental beam weight is simultaneously removed.

With the use of the supplemental beam weight it has been found desirable in practice to normally maintain the permanent pendulum weight 9 slightly above a plumb line position so that the pull exerted by the slightly raised pendulum will aid in offsetting the weight of the platter and scale beam when the auxiliary pendulum weight is on the pendulum. Without the supplemental beam weight it may happen that when the auxiliary pendulum weight is deposited upon the raised permanent pendulum the added weight would move the pendulum from its normal raised position toward the plumb line position and thereby throw the indicator hand 5 connected with the pendulum out of alinement with the zero indication on the chart. In order to counteract for this falling movement of the pendulum when the auxiliary weight is deposited thereon, the supplemental beam weight is provided to increase the pull of the beam sufficiently to raise the pendulum with the auxiliary weight thereon to the same angular position held by the permanent pendulum before the auxiliary weight was deposited thereon, thereby maintaining the zero alinement of the indicator hand with the zero indication on the chart and insuring that the extent of travel of the auxiliary weight will be identical with that of the permanent pendulum.

Operation: With the scale operating at the higher weight capacity the parts will be relatively positioned as shown in Figs. 1 and 3, the auxiliary pendulum weight being, of course, on the pendulum to augment its counterbalancing effect in the weighing of goods and the supplemental beam weight being on the scale beam to maintain the desired initial angular position of the pendulum. The hanger has left contact with the auxiliary pendulum weight and maintains a position beyond the same so as to leave the pendulum entirely free from any counteracting influence. At this time the indicator plate 55 (see Fig. 2) displays the inscription "Read red figures" through an opening in the rear of the housing 4, and the side of the rotatable strip 5ᵃ exhibiting red figures is displayed. To adjust the scales for the lower weight capacity it is only necessary to turn the knob 33 to the right. The first effect will be to move the walls of the slot 34 in the sleeve 32 into contact with the pin 31 to rotate the shaft 28 and the elements attached thereto. This rotation of the shaft brings the upper arm 35 into contact with the ratchet 37 to lift the same from the ratchet plate 39, and then to contact with the lugs 39ᵃ to turn the ratchet plate and the hanger arm 27 so as to advance the hanger arm from its lowered position toward its uppermost position. In this movement the wheels 30 will ride up the inclined wall of the recess 20 to raise the rails 18 into contact with the trunnions of the auxiliary pendulum weight and lift said weight from the depression 11 in the permanent pendulum weight, the hanger arms then contacting with the trunnions of the auxiliary weight and forcing the same up the inclined walls thereof to the runways 21, this upward movement being aided by the spring 42 connected with the lower arm 36 on the shaft 28, inasmuch as during the first half of the movement of the shaft 28 the spring 42 is being compressed as hereinbefore described and the force of the compressed spring is utilized to aid in the last half of the movement of the hanger arm and connected parts. Simultaneously, the upper arm of the hanger carries the fork 43 into engagement with the star wheel 44 to rotate the strip or bar 5ᵃ to display the black figures thereon, and the curved arm 45 is swung upwardly to lift the lever 47 through the link 46, the elevation of the lever 47 serving to bring the conical member 52 into engagement with the supplemental beam weight 53 to lift the weight from the beam. Also the lifting of the lever 47 is made to actuate the indicator plate 55 through the staff 56 connected at its lower extremity with the lever 47, as shown in Figs. 3 and 5, so as to bring the inscription "Read black figures" into alinement with the opening in the scale housing. When the hanger arm and connected parts have reached the end of their movement they are locked in these positions by means of the pawl 37, which falls into the peripheral aperture in the ratchet plate 39.

To replace the auxiliary weight upon the pendulum, it is simply necessary to turn the knob 33 to the left until the opposite walls of the slots 34 contact with the pin 31 in the shaft 28, further rotation of the knob then rotating the shaft 28 and the upper and lower arms 35 and 36 connected therewith so as to lift the pawl 37 from engagement with the ratchet plate 39, whereupon the hanger arm is free to fall from its uppermost position to deposit the auxiliary weight on the pendulum, the wheels 30 lifting the rails 18 during the downward travel of the hanger so as to guide the auxiliary weight into the central depression 11 of the pendulum. Simultaneously, the fork 43 of the upper hanger arm contacts with the star wheel 44 to rotate the strip 5ᵃ on the indicator hand to bring the red figures thereon into view, and the curved arm 45 is swung so as to permit the falling of the lever 47 to deposit the supplemental beam weight 53 upon the scale beam, the falling of the lever 47 also serving to pull the indicator plate 55 downwardly so as to bring the inscription "Read red figures" into view through the opening in the scale housing. During the first half of the movement of the shaft 28, the spring 42 will, of course, be compressed and the tension of the compressed spring will then aid in forcing the several elements to travel the full extent of their movements.

It will be seen that the means above described for controlling the auxiliary pendulum weight does not depend at all upon any particular position which the pendulum may occupy, and hence it is not necessary to provide any means for holding or otherwise positioning the pendulum in removing the auxiliary weight therefrom or in replacing said weight thereon, the automatic elevation of the guide rails 18 as the auxiliary weight and hanger arm approach the pendulum serving to effectively guide the auxiliary weight into the central depression in the permanent pendulum weight.

It will also be noted that the deposit of the supplemental beam weight on the scale beam and its removal therefrom simultaneously with the deposit or removal of the auxiliary pendulum weight from the pendulum serves to correct any inaccuracy that might be effected in the weighing or indicating mechanism of the scale by the change of weight in the pendulum, inasmuch as the same initial angular position of the pendulum is maintained regardless of the increase or decrease in the weight of the pendulum.

While it will be apparent that the illustrated embodiment of my invention herein disclosed is well adapted to adequately fulfil the objects primarily stated, it is to be understood that my invention is susceptible to modification, variation and change without departing from the spirit and scope of the invention as set forth in the subjoined claims.

Having described my invention, I claim:

1. In a scale, a platform, lever mechanism supporting the scale platform, pendulum weighing mechanism connected with the lever mechanism, means for increasing the effective weight of the pendulum mechanism, and means controlled by the first-mentioned means for simultaneously increasing the pull of the lever mechanism on the pendulum mechanism.

2. In a scale, a platform, lever mechanism supporting the scale platform, pendulum weighing mechanism connected with the lever mechanism, means for increasing the effective weight of the pendulum mechanism, and removable means controlled by the first-mentioned means arranged to simultaneously increase the pull on the pendulum mechanism.

3. In a scale, a platform, lever mechanism supporting the scale platform, pendulum weighing mechanism connected with the lever mechanism, means for increasing the effective weight of the pendulum mechanism, and a weight controlled by said means arranged to simultaneously increase the pull on the pendulum mechanism.

4. In a scale, a platform, lever mechanism supporting the scale platform, pendulum weighing mechanism connected with the lever mechanism, means for increasing the effective weight of the pendulum mechanism, and a weight controlled by said means and adapted to be moved into engagement with the lever mechanism simultaneously with the increase of weight of the pendulum mechanism to increase the pull of the lever mechanism on the pendulum mechanism.

5. In a scale, a platform, lever mechanism supporting the platform, pendulum weighing mechanism connected with and adapted to be actuated by the lever mechanism, a weight adapted to be deposited upon the pendulum mechanism to increase the effective weight thereof, and a weight controlled by said means and adapted to be deposited upon the lever mechanism to simultaneously increase the pull of the lever mechanism on the pendulum mechanism.

6. In a scale, a scale beam, pendulum weighing mechanism connected with and adapted to be actuated by the scale beam, means for increasing the effective weight of the pendulum, and means controlled by the first-mentioned means for simultaneously increasing the pull of the scale beam on the pendulum mechanism.

7. In a scale, a scale beam, pendulum weighing mechanism connected with and adapted to be actuated by the scale beam, means for increasing the effective weight of the pendulum, and means controlled by the first-mentioned means for simultaneously increasing the effective pull on the pendulum mechanism.

8. In a scale, a scale beam, pendulum weighing mechanism connected with and adapted to be actuated by the scale beam, means for increasing the effective weight of the pendulum, and a removable weight controlled by said means and adapted to be connected with the scale beam to simultaneously increase the pull of the scale beam on the pendulum mechanism.

9. In a scale, a scale beam, pendulum weighing mechanism connected with and adapted to be actuated by the scale beam, a weight adapted to be deposited upon the pendulum mechanism to increase the effective weight controlled by said means and of the pendulum, and a weight adapted to be deposited upon the scale beam to simultaneously increase the pull of the scale beam on the pendulum mechanism.

10. In a scale, a scale beam, pendulum weighing mechanism connected with and adapted to be actuated by the scale beam, and means under a single control for simultaneously increasing or diminishing the effective weight of the pendulum and scale beam.

11. In a scale, a scale beam, pendulum weighing mechanism connected with and adapted to be actuated by the scale beam, and weight-depositing means adapted to simultaneously deposit or remove auxiliary weights from the pendulum and scale beam respectively.

12. In a scale, a platform, lever mechanism supporting the platform, pendulum weighing mechanism connected with the lever mechanism and adapted to be normally raised to an initial angular position through the pull exerted thereon through the lever mechanism, means for increasing the weight of the pendulum, and means for increasing the pull upon the pendulum to maintain the pendulum in the same initial angular position.

13. In a scale, a platform, lever mechanism supporting the platform, pendulum weighing mechanism connected with the lever mechanism and adapted to be normally raised to an initial angular position through the pull exerted thereon by the lever mechanism, a weight adapted to be deposited upon the pendulum to increase the effective weight thereof, and means to increase the weight of the beam to maintain the pendulum in the same initial angular position.

14. In a scale, a platform, lever mechanism supporting the platform, pendulum weighing mechanism connected with the lever mechanism and adapted to be normally raised to an initial angular position through the pull exerted thereon by the lever mechanism, a weight adapted to be deposited upon the pendulum to increase the effective weight thereof, and a weight adapted to be simultaneously deposited upon the lever mechanism to maintain the pendulum in the same initial angular position.

15. In a scale, a scale beam, pendulum weighing mechanism connected with the scale beam, the scale beam being so weighted that the pendulum is normally raised to a predetermined angular position, means for increasing the effective weight of the pendulum, and means for simultaneously increasing the weight of the scale beam to maintain the pendulum in the same angular position.

16. In a scale, a scale beam, pendulum weighing mechanism connected with the scale beam, the scale beam being so weighted that the pendulum is normally raised to a predetermined angular position, an auxiliary weight adapted to be deposited upon the pendulum to increase the effective weight thereof, and an auxiliary weight adapted to be simultaneously deposited upon the scale beam to increase the pull of the scale beam to maintain the pendulum in the same angular position.

17. In a scale, a scale beam, pendulum weighing mechanism connected with the scale beam, the scale beam being so weighted that the pendulum is normally raised to a predetermined angular position, and auxiliary weight-depositing means adapted to simultaneously deposit or remove auxiliary weights on or from the pendulum and scale beam respectively.

18. In a scale, a scale beam, pendulum weighing mechanism connected therewith, means for increasing the effective weight of the pendulum, and means for simultaneously increasing the effective weight of the scale beam, including a lever, a vertically-movable rod suspended therefrom, and an auxiliary weight normally carried by said rod and adapted to be deposited on the scale beam.

19. In a scale, a scale beam, pendulum weighing mechanism connected therewith, means for increasing the effective weight of the pendulum, and means for simultaneously increasing the effective weight of the scale beam, including a lever, a vertically-movable rod suspended therefrom, an auxiliary weight normally carried by said rod and adapted to be deposited on the scale beam, and means for rocking the lever to deposit the auxiliary weight on the beam simultaneously with the increase of weight of the pendulum mechanism.

20. The combination in pendulum scales, of an auxiliary weight for the pendulum, mechanical operating means for depositing and displacing the auxiliary weight, and means coöperating with said operating means for forcing said weight to travel the full extent of its path of movement when moved from or toward the pendulum, including a rod pivoted to a part of the operating mechanism, a cylinder telescoping said rod and pivoted to a fixed portion of the scale, and a spring surrounding and abutting against the opposite extremities of the rod and cylinder.

21. The combination in pendulum scales, of an auxiliary weight for the pendulum, a track upon which said weight may travel into and out of engagement with the pendulum, means for forcing said weight to travel along the track into and out of engagement with the pendulum, and means for elevating the track adjacent the pendulum as the weight approaches the pendulum.

22. The combination in pendulum scales, of an auxiliary weight for the pendulum, a track upon which said weight may travel into and out of engagement with the pendulum, means for forcing said weight to travel along the track into and out of engagement with the pendulum, and means coöperating with the auxiliary weight and track for raising the track as the weight is deposited upon or removed from the pendulum.

23. The combination in pendulum scales, of an auxiliary weight for the pendulum, a pivoted track upon which said weight may travel into and out of engagement with the pendulum, and means coöperating with the track and auxiliary weight for swinging the track on its pivot as the weight is deposited upon or removed from the pendulum.

24. The combination in pendulum scales, of an auxiliary weight for the pendulum, a pivoted track upon which said weight may travel into and out of engagement with the pendulum, and a swinging arm engaging the weight and track and adapted to swing the track on its pivot as the weight is deposited upon or removed from the pendulum.

25. The combination in pendulum scales, of an auxiliary weight for the pendulum, a pivoted track upon which said weight may travel into and out of engagement with the pendulum, and a swinging arm engaging the auxiliary weight and track, said track being so shaped and positioned that during the swinging movement of said arm the track will be swung on its pivot as the auxiliary weight approaches the pendulum.

26. The combination in pendulum scales, of an auxiliary weight for the pendulum, a pivoted track upon which said weight may travel into and out of engagement with the pendulum, and a swinging arm engaging the auxiliary weight and track, said track being formed with an eccentric surface increasing in radial distance from the pivot of the swinging arm as the track approaches the initial position of the pendulum, whereby during the swinging movement of the arm to deposit the weight the track will be elevated as the weight approaches the pendulum.

27. The combination in pendulum scales, of an auxiliary weight for the pendulum, a pivoted track upon which said weight may travel into and out of engagement with the pendulum, and a swinging arm engaging the auxiliary weight and track, said track being formed with an eccentric surface increasing in radial distance from the pivot of the swinging arm as the track approaches the initial position of the pendulum, whereby during the swinging movement of the arm to deposit the weight the track will be swung upwardly as the weight approaches the pendulum.

HALVOR O. HEM.

Witnesses:
C. F. MILLER, Jr.,
EDW. F. ULRICH.